Oct. 8, 1935.  M. L. CARRIER  2,016,625
HOSE CARRIAGE
Filed Jan. 2, 1934
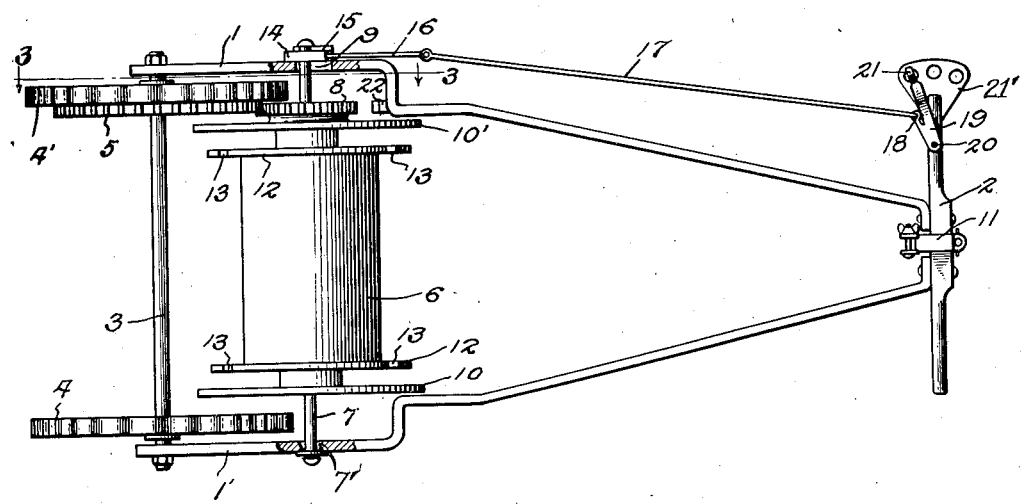
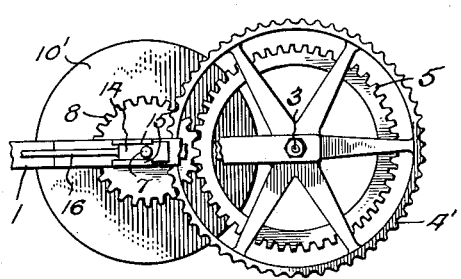
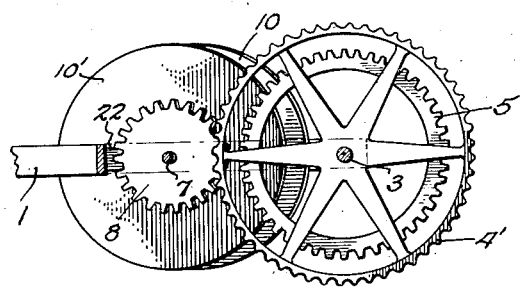
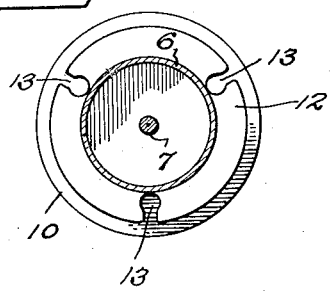
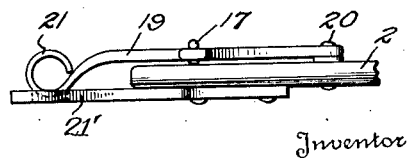
Inventor
M. L. Carrier
By Edwin Guthrie
Attorney Patented Oct. 8, 1935

2,016,625

UNITED STATES PATENT OFFICE 2,016,625

HOSE CARRIAGE

Milton Leroy Carrier, Centralia, Wash.

Application January 2, 1934, Serial No. 704,965

1 Claim. (Cl. 242—88)

This invention relates to improvements in hose carriages. Its objects are: to provide a hose carriage which will automatically wind and unwind the hose, by the simple forward and backward movement of the carriage; to provide a winding mechanism which will wind the hose from its position of use without unnecessarily dragging the unwound portion over the ground; and to provide a means for control, from the handle of the carriage, of the movement of the reel, to the extent that it may be caused to rotate with the wheels of the carriage, or be freed from its connection with the wheels of the carriage and put in a neutral state in which it may be rotated in either direction independently of the action of the carriage wheels, or be locked into a stationary position and out of connection with the wheels of the carriage.

The invention consists of certain parts and arrangements thereof, as hereinafter described and embraced in the appended claim.

Fig. 1 is a top view of the complete hose carriage.

Fig. 2 is a side view showing the reel mechanism connected by appropriate gearing with the wheels of the carriage. Part of the carriage frame is broken away to reveal the meshing gears.

Fig. 3 is a view as indicated by the line 3—3 in Fig. 1, showing the reel mechanism in its locked position.

Fig. 4 is a detailed view of the auxiliary reel flange.

Fig. 5 is a detailed view of the plate and spring catch by which the angular movement of the reel is controlled from the handle of the carriage.

Throughout the specification and drawing, the same number is used to refer to the same part.

Referring to the figures, 1 and 1' designate the two opposite sections of the frame of the carriage. At their closer extremities, they are connected by the handle 2. At their wider extremities, the axle 3 passes through the frame sections on suitable bearings. Secured to the axle 3 on either side, inside of its points of junction with the frame sections, are the two wheels of the carriage, 4 and 4'. These wheels are of metal and their tread surfaces are corrugated to reduce slippage when the carriage is run over wet lawns. Also secured to the axle 3 and fastened against the inner face of the carriage wheel 4', is the gear wheel 5.

The reel 6 is fastened on axle 7 which also carries a gear wheel 8 on the same side of the machine and in line with gear wheel 5. The axle 7 passes through the frame section 1' in a divergent opening in which the end of the axle 7 is located and has a limited movement. The opening is 7' in Fig. 1. The wider part of the opening is at the inside face of the frame section. The narrower part of the opening is near the outside surface of the frame section; and at the outside itself, the opening is only slightly wider and is somewhat elliptical in shape. The opening is so shaped in order that the axle may pivot in the frame 1', for a certain limited movement in the plane of the frame, without binding or pinching. The other end of axle 7 passes through the frame section 1 in a slot 9, which permits the movement of this end of the reel axle back and forth in the plane of the frame. The axle 7 is located at such a position in the frame, that when the sliding end is at the end of its slot nearest to axle 3, the axle is at right angles to the parallel parts of the frame sections 1 and 1' and the gear wheel 8 meshes with the gear wheel 5 of axle 3.

The reel 6 is provided with end flanges 10 and 10' and inner flanges 12 which occur at either end of the reel drum and at a distance slightly greater than the width of the ordinary hose from the end flange. These flanges have several slots 13, as indicated in Fig. 4, around their circumferences, through which the ends of the hose may be passed to secure them. The end of the hose first attached to the reel may thus be held in place and the outer end of the hose, after winding is complete, may thus be secured in the wound position.

The sliding end of reel axle 7 passes thru a bearing plate 14 located on the outside surface of frame section 1'. Bearing plate 14 is adapted to slide backward and forward in the guides 15, carrying with it the end of axle 7. The forward and backward movements are limited by the ends of slot 9 in which axle 7 slides. Integral with the bearing plate and projecting from it in the direction of the carriage handle is the member 16 which is pivotally connected to the rod 17, in a manner which permits movement of the rod in the plane of the frame section. Rod 17 runs directly to its pivotal connection 18 with the pivoted lever 19. Lever 19 is pivoted at 20 on top of handle 2. The free end of lever 19 is provided with a spring catch 21, which is adapted by the resiliency of the spring, to seat itself in one of three recesses in the fan-shaped plate 21', over which it may be moved and thus hold lever 19 and, through it and the connecting means, the reel axle 7 in any one of three predetermined positions.

At the point 22 on the frame section 1 are two projections of the size and shape of the gear teeth of gear wheels 5 and 8. These projections are located in direct line with gear wheel 8 and facing it at such a distance as to mesh with it when the sliding end of axle 7 is drawn to the end of slot 9 nearest to handle 2.

The operation of the device is as follows. With the reel axle in the intermediate or neutral position, meshing with neither gear wheel 5 nor projections 22, lever 19 is set in its middle position with spring catch 21 extending into the middle recess of the fan-shaped plate. If it is desired to wind up the hose, the end is slipped into one of the slots 13 or other holding means. The lever 19 is shifted to its rear-most position and the spring catch seated in its rear-most recess in the plate. This forces axle 7 up to the end of its slot nearest to axle 3, where the axle is perpendicular to the two frame sections 1 and 1' and the gear wheel 8 is in mesh with the gear wheel 5, as shown in Fig. 2. The carriage is then wheeled, by the application of pressure at the handle 2, in the path of the hose. The turning of the carriage wheels 4 and 4' and the carriage axle 3 is transmitted to the reel axle through the gear wheels 5 and 8, and the hose is wound on the drum. The proportion between the diameters of the gear wheels 5 and 8 should be the same as that between the diameters of the carriage wheel and the reel drum. By this arrangement, the hose will only be wound in a length equal to the forward movement of the carriage during the winding of the first layer upon the drum and subsequently only slightly faster, as the layers of hose increase the diameter of the reel. This keeps at a minimum the amount which the hose must be dragged over the ground in the process of winding. By increasing the size of the drum, the number of layers necessary in winding a given length of hose and consequently the amount of dragging is decreased. A certain amount of dragging in the winding of the upper layers is believed desirable to insure a tightly and evenly wrapped hose. When the entire hose has been thus wound, the free end is passed through one of slots 13 in order to secure it against unwinding.

The lever is now moved to its foremost position and the spring catch allowed to seat in the foremost recess of the handle plate. This draws axle 7 back to the end of its slot nearest to handle 2 and causes the teeth of gear wheel 8 to mesh with the two teeth-like projections 22 of frame section 1, so that the reel is locked against movement. In this position, the carriage may be moved at will without disturbing the stationary condition of the reel.

In unwinding the hose, the reel is set in the neutral position by means of the lever 19. The hose can then be drawn freely from the reel while the carriage is allowed to remain stationary.

Having thus described my invention, I claim—

In a hose carriage, the combination with a frame, of an axle connected with the frame at the rear of the frame, said axle provided with a pair of wheels for supporting the frame upon the ground, a second axle carried by the frame in front of the rear axle, a reel carried by the second axle, gear wheels secured to said axles in separable relation, said reel axle being constructed and arranged to be moved forward or rearward at one end whereby said gear on the reel shaft is arranged in three separated positions, said frame being extended forwardly, a hand operated lever and catch device located on the forward end of the frame, means connecting said lever to said reel axle and adapted to secure at the will of the operator said reel axle in its rearmost position wherein said gears engage, or into the second and intermediate position wherein said gears are disengaged, or into the third and forward position, and said frame having a locking projection arranged to engage the gear on said reel shaft in said third position whereby the reel is held stationary.

MILTON LEROY CARRIER.